(12) United States Patent
Yost et al.

(10) Patent No.: US 6,256,490 B1
(45) Date of Patent: Jul. 3, 2001

(54) METHOD AND APPARATUS FOR PROVIDING A CELL TRAFFIC SUPERVISION ALARM

(75) Inventors: George P. Yost, DeSoto; Shankari Panchapakesan, Dallas; Yunis Shahdad, Richardson, all of TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/223,708

(22) Filed: Dec. 30, 1998

(51) Int. Cl.[7] .............................. H04Q 7/20; H04Q 7/30; H04Q 7/34
(52) U.S. Cl. ..................... 455/405; 455/423; 455/424; 455/8; 455/9; 455/67.1; 455/67.7; 379/111; 379/1; 379/26; 379/16; 379/22
(58) Field of Search ..................................... 455/423, 424, 455/405, 8, 9, 67.1, 67.7, 403; 379/111, 1, 26, 16, 22

(56) References Cited

U.S. PATENT DOCUMENTS

| | | | |
|---|---|---|---|
| 5,241,534 | * | 8/1993 | Omuro et al. ........................ 379/111 |
| 5,285,494 | * | 2/1994 | Sprecher et al. ..................... 379/111 |
| 5,790,955 | * | 8/1998 | Tomoike .............................. 455/405 |
| 5,872,911 | * | 2/1999 | Berg ..................................... 379/111 |
| 5,913,162 | * | 6/1999 | Gourdin et al. ...................... 455/423 |

* cited by examiner

*Primary Examiner*—William Trost
*Assistant Examiner*—Keith Ferguson
(74) *Attorney, Agent, or Firm*—Jenkens & Gilchrist, P.C.

(57) ABSTRACT

A telecommunications system and method is disclosed for providing a cell traffic supervision alarm within a base station (BS) to notify the operator at a Mobile Switching Center (MSC) serving the BS that the BS has had no traffic for a period of time that is unreasonably long. The definition of "unreasonably long" is tied to normal traffic patterns at the BS. An alarm threshold time, which is defined as time between the cessation of all traffic on a BS and the triggering of the alarm, can be calculated based upon a statistical analysis of the traffic history of the BS to determine a time interval such that the probability is acceptably small that under normal conditions the BS would have gone for that entire length of time with no traffic at all. At the expiration of the alarm threshold time, the alarm is activated.

22 Claims, 4 Drawing Sheets

METHOD AND APPARATUS FOR PROVIDING A CELL TRAFFIC SUPERVISION ALARM

BACKGROUND OF THE PRESENT INVENTION

1. Field of the Invention

The present invention relates generally to telecommunications systems and methods for generating alarms due to base station failure, and specifically to providing a cell traffic supervision alarm.

2. Background and Objects of the Present Invention

Mobile communications, especially cellular radio, is one of the fastest growing and most demanding telecommunications applications ever. Today it accommodates a large and continuously increasing percentage of all new telephone subscriptions around the world with the increasing service requirements. Cellular networks have evolved into two different networks within Time Division Multiple Access (TDMA) technology. The European cellular network uses the Global System for Mobile Communication (GSM) standard as the digital cellular system. In the United States, cellular networks have traditionally been primarily analog, but recent advances have been incorporating digital systems within the analog networks. One such North American cellular network is the D-AMPS network, which is described hereinbelow.

With reference now to FIG. 1 of the drawings, there is illustrated a D-AMPS Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR area 12 that controls the LA 18.

Each Location Area 12 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless. The MSC 14 is in communication with a Base Station (BS) 24. The BS 24 is the physical equipment, illustrated for simplicity as a radio tower, that provides radio coverage to the geographical part of the cell 22 for which it is responsible.

With further reference to FIG. 1, the PLMN Service Area or cellular network 10 includes a Home Location Register (HLR) 26, which is a database maintaining all subscriber information, e.g., user profiles, current location information, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the MS's 20 currently located within the MSC/VLR area 12. If an MS 20 roams into a new MSC/VLR area 12, the VLR 16 connected to that MSC 14 will request data about that MS 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

If a failure occurs in a BS 24, in many cases, the BS 24 will be unable to handle any traffic. Loss of service at a cell 22 means a loss of revenue to the network operator as well as an inability by mobile subscribers to place calls. The inability of mobile subscribers to place calls can cause dire consequences, especially if one or more of the calls is an emergency call.

Currently, there are specially-designed alarms in place in BS's 24 to detect specific hardware or software conditions. However, there are certain conditions under which a BS 24 will be unable to handle any traffic, but yet there is no alarm transmitted to the MSC 14. Causes for this may include, but are not limited to, normal degeneration or vandalism of certain key cables inside the BS 24 which may not have alarm supervision. In this situation, routine checks of the BS 24 might uncover the problem, or an operator at the MSC 14 might notice that there has been no traffic on the BS 24 for an unreasonable period of time. However, especially in the case of remote BS's 24, such routine checks may be infrequent. Alternatively, the condition might come to the attention of the operator if a user complains about lack of service.

All of the above solutions are inadequate to protect against potentially lengthy periods of time during which service in a cell 22 is unavailable, which can cause, among other things, as stated hereinbefore, increased customer dissatisfaction and loss of revenue for the operator. In addition, as mention above, loss of service even for a small period of time could also result in serious consequences if an emergency call is necessary but not possible.

It is, therefore, an object of the present invention to provide an alarm that is triggered by lack of normal traffic at a cell site.

It is a further object of the present invention that the alarm automatically adjusts itself based upon the normal traffic load at the cell site.

SUMMARY OF THE INVENTION

The present invention is directed to telecommunications systems and methods for providing a cell traffic supervision alarm to notify the operator at the MSC if a BS has had no traffic for a period of time that is unreasonably long. The definition of "unreasonably long" is tied to normal traffic patterns at the BS. An alarm threshold time, which is defined as time between the cessation of all traffic on a BS and the triggering of the alarm, can be calculated based upon a statistical analysis of the traffic history of the BS to determine a time interval such that the probability is acceptably small (as defined by the network operator) that under normal conditions the BS would have gone for that entire length of time with no traffic at all. At the expiration of the alarm threshold time, the alarm is triggered. The alarm threshold time is preferably as short as possible, while also maintaining the probability of a false alarm at a level that is low enough to be acceptable to the operator.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
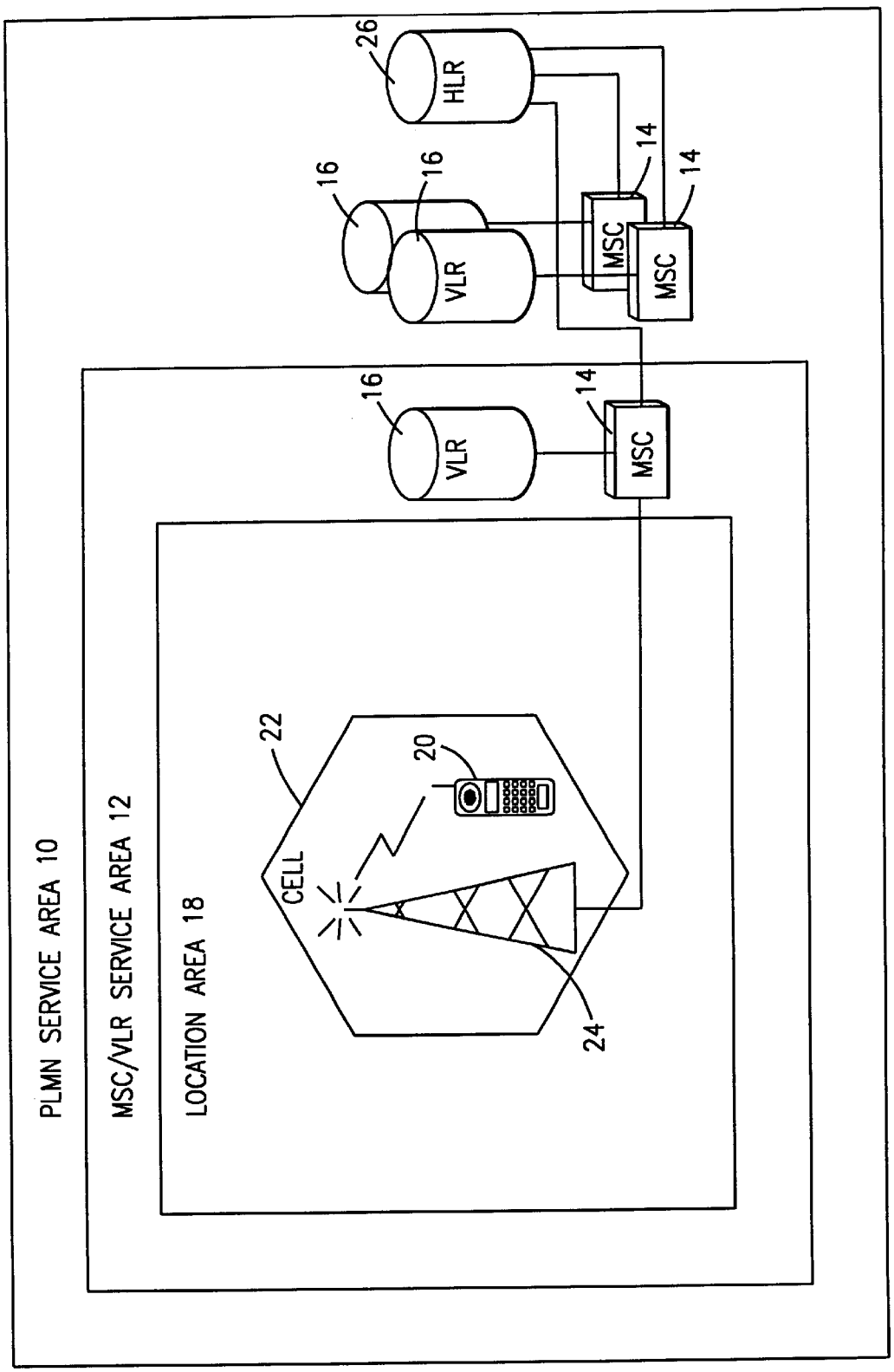
FIG. 1 is a block diagram of a conventional wireless telecommunications system.
Figure 2:
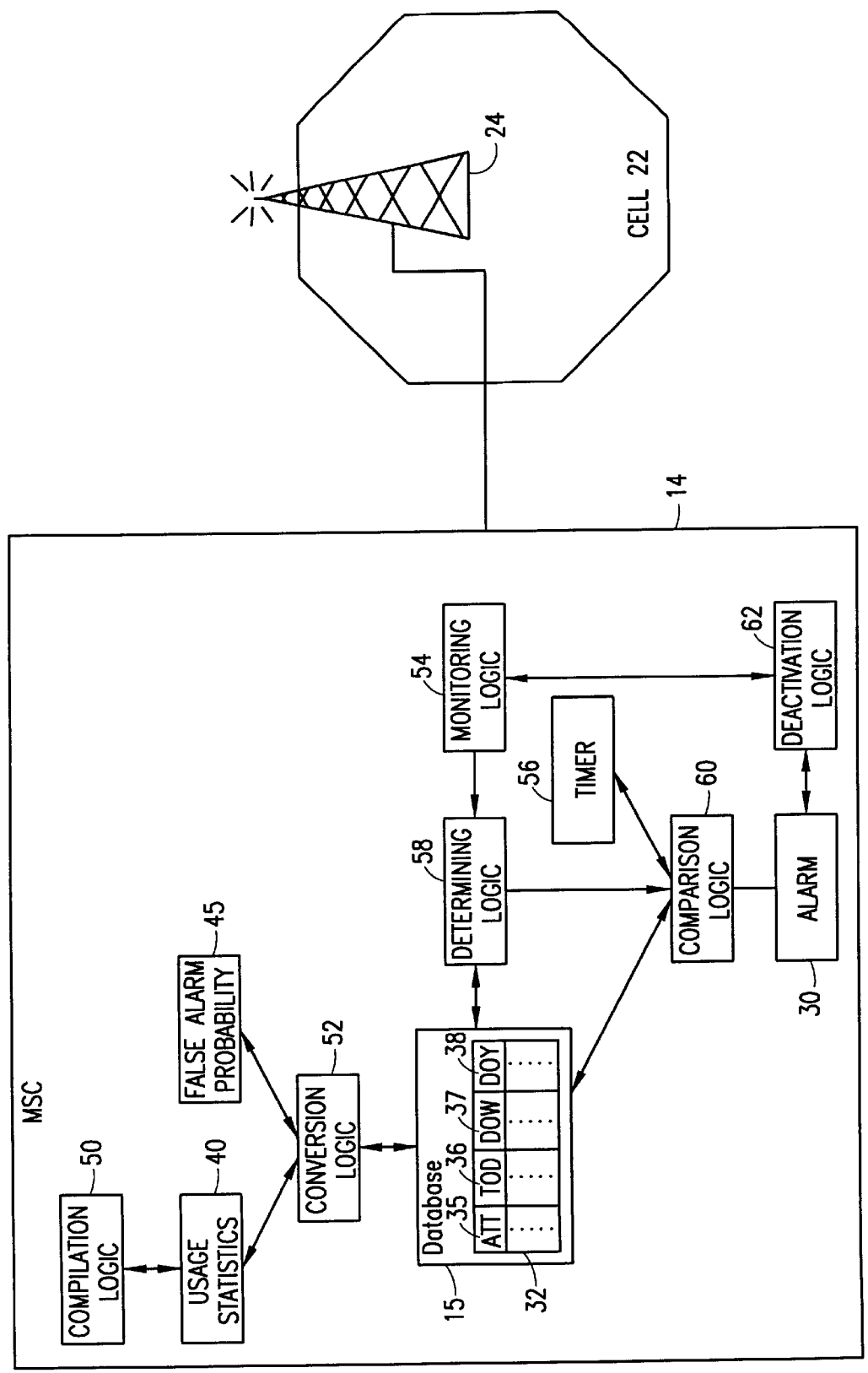
FIG. 2 illustrates a cell traffic supervision alarm in accordance with preferred embodiments of the present invention.

With reference now to FIG. 2 of the drawings, a cell traffic supervision alarm 30 associated with a base station (BS) 24 can be implemented to notify the operator at a Mobile Switching Center (MSC) 14 that the BS 24 serving a cell 22 has had no traffic for a period of time that is unreasonably long, which can indicate that the BS 24 is not operational. The definition of "unreasonably long" is tied to normal traffic patterns at the BS 24. An alarm threshold time 35, which is defined as the time between the cessation of all traffic on the BS 24 and the triggering of the alarm 30, can be calculated based upon a statistical analysis of the traffic history of the BS 24 to determine an alarm threshold time 35 such that the probability is acceptably small (as defined by the network operator) that under normal conditions the BS 24 would have gone for that entire length of time 35 with no traffic at all.

At the expiration of the alarm threshold time 35, the alarm 30 is triggered. However, the alarm 30 ceases automatically if traffic resumes on the BS 24. In addition, the network operator can have the option of manually ceasing the alarm 30 (or temporarily disabling it entirely for a particular BS 24) if it were understood that there might be special circumstances, e.g., temporary closure of a key highway, causing the condition. Furthermore, in the event of a condition that would affect many BS's 24, such as a hurricane, the network operator can have the option of temporarily disabling the alarm 30 entirely for every BS 24 in an area.

In alternative embodiments of the present invention, at cell sites 22 that are designed to be small and inexpensive, this single alarm 30 can be used in place of a few alarms (not shown) that test for specific failure modes of the entire BS 24. The service technicians would then be responsible for determining the specific cause of failure at the BS 24. Often, this is sufficiently obvious, e.g., the antenna is down, a cable has become disconnected due to vandalism, etc., that the more specific fault information relayed to the MSC 14 by the normal type of alarm, e.g., a VSWR fault, is not necessary to aid the technicians in finding the problem.

The alarm threshold time 35 is preferably adjustable based upon the day of the week 37 and the time of the day 36. For example, during a normally busy time of day 36, the alarm threshold time 35 may be no more than a few minutes. However, during the middle of the night 38, especially in a low-traffic area, the alarm threshold time 35 may be, for example, an hour. In addition, the alarm threshold time 35 can be implemented as a function of day of the year 38. For example, local holidays might show a substantially different traffic pattern and the network operator may wish to take that into account.

In addition, the alarm threshold time 35 is preferably as short as possible, while also maintaining the probability of a false alarm at a level that is low enough to be acceptable to the network operator. That level depends upon the number of BSs 24 that must be monitored. For example, if the alarm threshold time 35 is set such that a single BS 24 triggers a false alarm only once a year, a network 10 with 365 BSs 24 triggers a false alarm somewhere in the network 10 on the average of about once a day. False alarms increase the burden on the MSC 14 operators, but can be tolerated, provided they occur infrequently.

It should be noted that a relatively small increase in the alarm threshold time 35 can result in a large decrease in the probability of triggering a false alarm under reasonable circumstances. Thus, the alarm threshold time 35 is not sensitive to the desired probability level. Therefore, it is practical for the network operator to require a low false alarm probability without resulting in unduly long waiting times for a real alarm 30. This means that the cell traffic supervision alarm 30 will not place an undue burden of false alarms on the network operator's personnel at the MSC 14.

The acceptable alarm threshold time 35 also depends upon the traffic load. For example, BSs 24 with low traffic load typically have a relatively long alarm threshold time 35. However, it might be desirable to the network operator to decrease the alarm threshold time 35 for a small number of such BS's 24 to expedite the notification of the alarm 30.

In order to determine the alarm threshold time 35, statistical decision theory can be used based upon usage statistics 40 and a desired false alarm probability parameter 45 set by the network operator. All of the computations for determining the alarm threshold time 35 and activating the alarm 30 are performed in the MSC 14. Therefore, the computations are not dependent upon communications between the BS 24 and the MSC 14.

Once a BS 24 is running and carrying traffic, BS usage statistics 40 can be collected using a number of measurement techniques, which depend upon the type of technology (e.g., GSM, AMPS-DAMPS, CDMA, . . . ), the equipment vendor, and the needs of the network operator. The usage statistics 40 are analyzed and the results of this analysis are stored in a database 15 within the MSC 14. This stored data 32 includes the alarm threshold time 35 as a function of the time of the day 36 and the day of the week 36. This threshold 35 is calculated on the basis of the usage statistics 40 using a statistical decision—theoretic algorithm. In addition, the stored data 32 can optionally include the alarm threshold time 35 as a function of specific days of the year 38, such as holidays, that might substantially alter the usage. This stored data 32 can take the form of a parameterized mathematical function or a table of values with an interpolation algorithm. Therefore, the memory requirements for each BS 24 need not be large, particularly if the traffic patterns of nearby BS's are similar and the same data 32 can be used.

Figure 3:
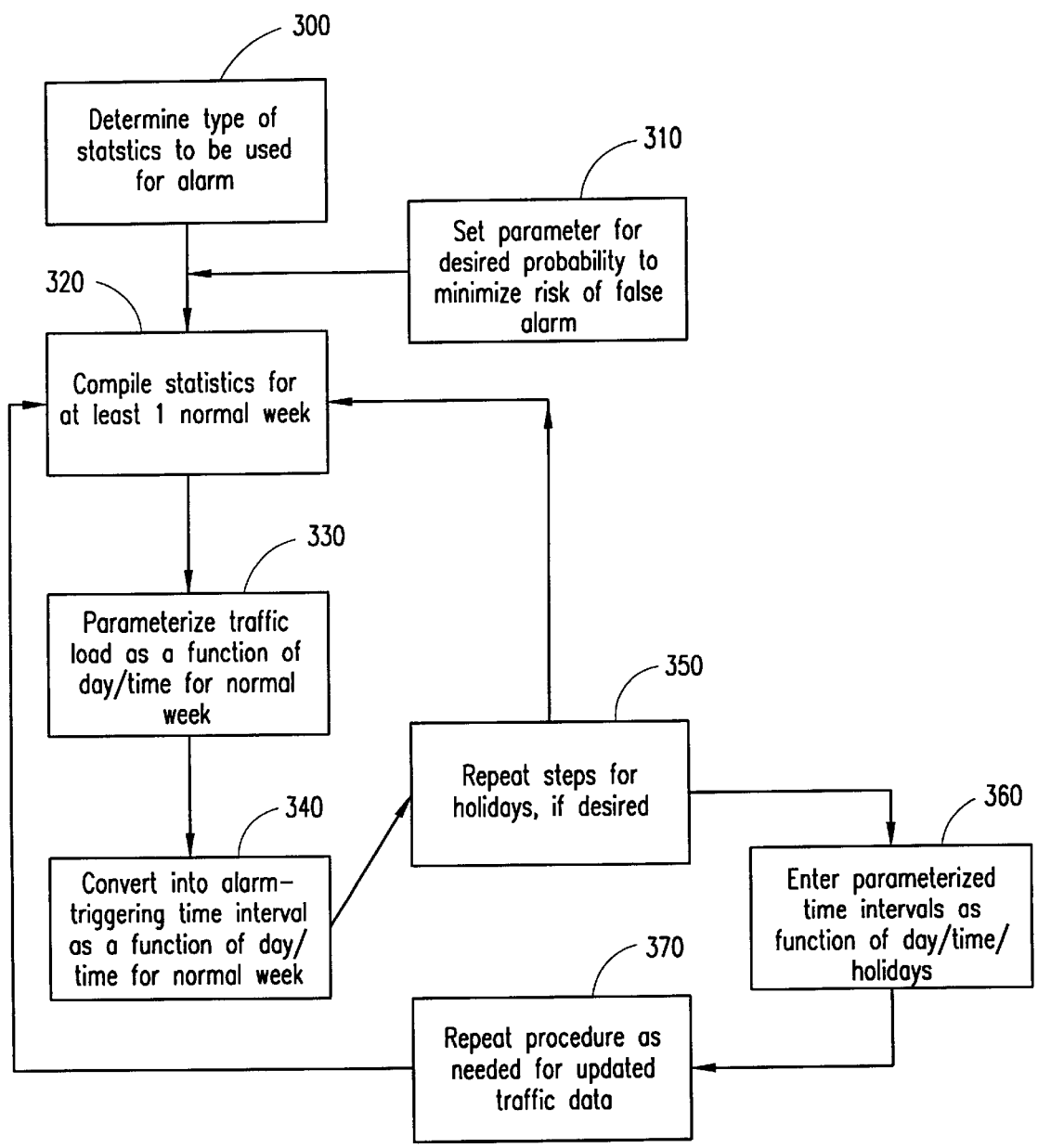
FIG. 3 is a flow diagram illustrating steps in calculating an alarm threshold time in accordance with embodiments of the present invention.

A sample implementation of the collection and statistical analysis of usage statistics 40 in order to determine the alarm threshold time 35 as a function of the time of the day 36 and the day of the week 37 is shown in FIG. 3 of the drawings. Usage statistics 40 come in a variety of forms, such as the number of call originations as a function of time, the number of Erlangs used as a function of time, etc. Therefore, the network operator must first determine the type of usage statistics 40 to use in calculating the alarm threshold time 35 (step 300). Once the type of usage statistics 40 is decided upon (step 300), the network operator must set a parameter 45 for the desired probability of false alarms (step 310).

Thereafter, compilation logic 50 within the MSC 14 can compile usage statistics 40 for a BS 24 for a predetermined time period (step 320), such as one week, and parameterize the usage statistics 40 as a function of the day of the week 37 and the time of the day 36 for a normal day (step 330). Conversion logic 52 within the MSC 14 converts these usage statistics into alarm threshold times 35 as a function of the time of the day 36 and the day of the week 37 for a normal week (step 340). Optionally, this process can be repeated for holidays (step 350). Once the alarm threshold times 35 as a function of the time of the day 36, the day of the week 37, and optionally, the day of the year 38, has been calculated (step 350), the alarm threshold times 35 can be stored in the database 15 within the MSC 14 for the BS 24 (step 360).

Finally, these statistics 40 must occasionally be updated to reflect changes in the traffic patterns (step 370). The frequency of the updates should ideally depend upon the magnitude of the changes. For example, if the number of subscribers in the area were to double, then the number of calls per cell 22 per hour would increase substantially and it might be worth revising the database 15 for the affected cells 22. In many cases, the subscriber load increases, and therefore, an update can desirably shorten the alarm threshold time 35. If, however, the operator fails to do timely updates, then increased traffic without a corresponding decreased alarm threshold time 35 can decrease the probability of a false alarm. Although decreasing the probability of a false alarm does not increase the burden on the network operator's personnel, the testing is simply not as powerful as it could be. Alternatively, if the traffic load decreases, the network operator might observe an increase in the false alarm rate, indicating the need to update the statistics 40 for the affected cell(s) 22.

As an example, assume that the network operator has chosen to use the average number of call originations per unit of time, $\lambda$, as the usage statistic information 40. Once cell traffic has ceased, the alarm threshold 35 is obtained from the database 15, based on the historical value of $\lambda$ for that day and time. Once the alarm threshold time 35 is obtained, it is not changed until traffic resumes or the alarm 30 is activated even if enough time has passed that the historical traffic pattern might have changed. However, any rapid changes in the historical traffic pattern should be incorporated into the determination of the alarm threshold time 35.

For simplicity, in this example, the unit of time is taken to be one minute. In addition, it is assumed that each call is considered independent of all other calls, and that the probability that more than one call will originate at the same time is vanishingly small. Therefore, call originations occur as a Poisson process, which is well known in the art of stochastic processes. Thus, the probability $P_n$ that there are n call originations in a time interval of t minutes is given by the expression:

$$P_n = \frac{e^{\lambda}(\lambda t)^n}{n!} \quad (1)$$

Furthermore, the probability that there are zero call originations in a time interval t minutes follows from this as the expression:

$$P_0 = e^{\lambda t} \quad (2)$$

If the probability that there are zero call originations in a time interval t minutes is set by the network operator to the value p, the alarm threshold time $\tau$ 35, that is the length of time during which the probability is no more than p that there would be zero call originations under conditions of normal operations can be derived from the expression:

$$\tau = -\frac{1}{\lambda}\ln(p) \quad (3)$$

Therefore, the probability is no more than p that there will be a false alarm if the alarm threshold time 35 is set to $\tau$. This implies that if the network operator waits an amount of time $\tau$ following a call origination, the probability will be no more than p that there will be no call originations in that time unless the BS 24 has gone down. If, for example, the operator chooses to set $p=10^{-6}$, then a gap of the size of the time interval $\tau$ calculated from Eq. (3) will occur between calls no more frequently than once out of every 1,000,000 call originations, under normal traffic conditions. Thus, for a call origination frequency $\lambda$ per minute, there will be a false alarm no more often than once every 1,000,000/$\lambda$ minutes. Table 1 hereinbelow illustrates some typical results.

TABLE 1

| $\lambda$ (originations/min) | p | $\tau$ (min.) | Time before false alarm (min.) |
| --- | --- | --- | --- |
| 10 | 0.0001 | 0.921 | 1,000 |
| 10 | 0.00001 | 1.15 | 10,000 |
| 10 | 0.000001 | 1.38 | 100,000 |
| 10 | 0.0000001 | 1.61 | 1,000,000 |
| 10 | 0.00000001 | 1.84 | 10,000,000 |
| 1 | 0.000001 | 13.8 | 1,000,000 |
| 1 | 0.0000001 | 16.1 | 10,000,000 |
| 1 | 0.00000001 | 18.4 | 100,000,000 |
| 0.1 | 0.000001 | 138 | 10,000,000 |
| 0.1 | 0.0000001 | 161 | 100,000,000 |
| 0.1 | 0.00000001 | 184 | 1,000,000,000 |

From Table I we note that changing the false alarm probability parameter p 45 by a factor of 10 increases the time before a false alarm will occur by the same factor of 10, but increases the alarm threshold time $\tau$ 35 only by a relatively small amount. For a rough scale to judge the times before a false alarm, a calendar year is roughly 500,0000 minutes. Thus, for example, if there are normally 10 calls/minute, and p is set to be one part per 10 million, then $\tau=1.61$ minutes and there will be one false alarm only about every two years.

As another example, and more realistically, if $\lambda$ varies as a function of the time of the day and the day of the week, and the rate of change of $\lambda$ is sufficiently fast such that these changes must be taken into account in assigning an alarm threshold time $\tau$ 35, then $\tau$ must be adjusted to take those changes into account. If, for example, a call originates during a time when $\lambda$ is 1 call per 10 minutes ($\lambda=0.1$), then $\tau=161$ minutes for $p=1/10,000,000$, as can be seen from Table 1. However, if during those 161 minutes, the call rate changes substantially, then $\tau$ must be adjusted to take those changes into account.

To take these variations into account, Equation (2) above must be replaced with the following expression:

$$P_0 = \exp\left\{-\int_0^t \lambda(s)ds\right\}. \tag{4}$$

Assuming that call originations are still a Poisson process, but that the average rate of originations varies with time according to the function $\lambda(t)$, $P_0$ in Equation (4) represents, as in Equation (2), the probability that there are zero call originations in the time t beginning with the last call origination (t=0). By requiring that $P_0$ is a certain pre-set value p, or less, working backward from Equation (4) as before, the alarm threshold time $\tau$ 35 can be derived, such that the probability of a false alarm is no larger than p. Thus, from Equation (4) the replacement for Equation (3) can be derived as follows:

$$\ln(p) = -\int_0^\tau \lambda(s)ds. \tag{5}$$

Once the form of $\lambda(t)$ is determined, the integral can be performed and a value for $\tau$ can be determined. For example, if a call originates at 4 AM, at which time the normal traffic load in that particular cell is $\lambda$=1/10 calls/minute and p=1/10,000,000, and if $\lambda$ is constant, then $\tau$=161 minutes (Table 1). However, if $\lambda$ grows linearly with time from 4 AM until 7 AM, increasing at a rate of 1/30 calls/minute/minute, then at some time t minutes after 4 AM the number of call originations/minute is $\lambda$=0.1+t/30. At, for example, 7 AM, the average number of calls/minute has increased to 6.1 in that cell. Therefore Equation (5) becomes:

$$\ln(p) = -\tau/10 + \tau^2/60, \tag{6}$$

and by simple algebra, $$\tau = -3 \pm 30 \sqrt{0.01 - \ln(p)/15} \tag{7}$$

The result for this example is that $\tau$=28.2 minutes, considerably shorter than the result for the constant $\lambda$. Thus, if no succeeding call originates in 28.2 minutes, the cell traffic supervision alarm 30 would be initiated. This will turn out to be a false alarm only once in every 10,000,000 calls, assuming that the usage statistics 40 are correct and that the Poisson process model is correct.

Figure 4:
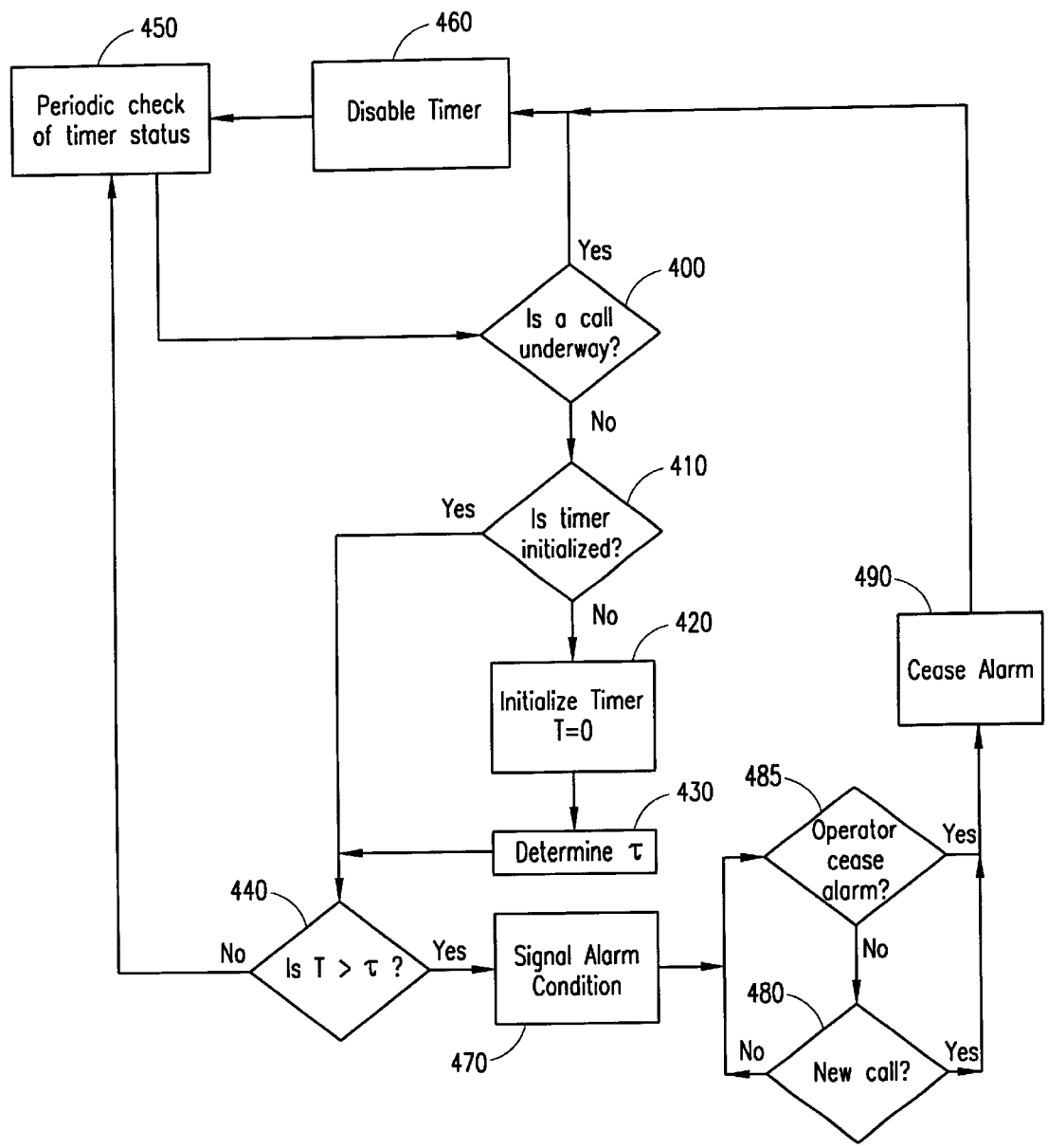
FIG. 4 is a flow diagram illustrating steps in implementing the cell traffic supervision alarm of the present invention.

With reference now to FIG. 4 of the drawings, once the alarm threshold times 35 as a function of the time of the day 36, the day of the week 37, and optionally, the day of the year 38, are calculated and stored in the MSC database 15, monitoring logic 54 within the MSC 14 can begin monitoring the BS 24 traffic (step 400). If there is no traffic on the BS 24 (step 400), e.g., all calls on the BS 24 have terminated, if a timer 56 has not yet been initiated (step 410), the MSC 14 initiates the timer 56 (step 420). Therefore, the time being measured is not the time since the last successful call origination, but rather the time since the last call termination. Although the alarm threshold time 35 is calculated from the call origination frequency, there will be some call duration time added to this before the alarm can trigger. Therefore, the alarm threshold time is conservative in the sense that the probability of false alarms is smaller than calculated because of the fact that the time being used is actually larger than the inter-origination time.

Thereafter, or simultaneous to setting the timer 56 (step 420), determination logic 58 within the MSC 14 determines the desired alarm threshold time 35 based upon the day of the week 37 and the time of the day 36 (step 430). On a regular basis comparison logic 60 within the MSC 14 compares the value of the timer 56 with the alarm threshold time 35 (step 440). If the value of the timer 56 does not exceed the alarm threshold time 35, the timer 56 status is checked (step 450). The frequency of such checks (step 450) should be such that the time between them is small compared with the typical alarm threshold time 35 during a busy period. Referring to Table 1, this might not need to be more than a few times per minute.

If at any time a call originates at the BS 24 or a call is transferred to the BS 24 from another cell via a handoff or handover (step 400), then the timer is disabled (step 460) until the next time all traffic ceases (step 400). However, if the value of the timer 56 exceeds the alarm threshold time 35 (step 440), then the alarm 30 is activated (step 470). While the alarm 30 is active, the process continues to check the status of the calls. If, even after the alarm 30 has activated (step 470), a call becomes active at the BS 24 (step 480), deactivation logic 62 within the MSC 14 ceases the alarm 30 (step 490). The network operator also has an option of manually ceasing the alarm 30 (step 485).

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for providing a cell traffic supervision alarm, comprising:

a base station serving a cell within a cellular network, said base station having traffic thereon; and a mobile switching center connected to said base station for monitoring said traffic on said base station, setting a timer when said traffic on said base station ceases and activating said cell traffic supervision alarm when said timer reaches a determined alarm threshold time calculated by said mobile switching center for said base station.

2. The telecommunications system of claim 1, wherein said mobile switching center further comprises:

compilation logic for compiling usage statistics based upon at least one of the time of the day and the day of the week for said base station.

3. The telecommunications system of claim 2, wherein said mobile switching center further comprises:

conversion logic for converting said usage statistics into at least one alarm threshold time as a function of at least one of the time of the day and the day of the week.

4. The telecommunications system of claim 3, wherein said mobile switching center further comprises:

a false alarm probability parameter, said conversion logic using said false alarm probability parameter to convert said usage statistics into said at least one alarm threshold time.

5. The telecommunications system of claim 3, further comprising:

a database within said mobile switching center for storing said at least one alarm threshold time.

6. The telecommunications system of claim 3, wherein said mobile switching center further comprises:

monitoring logic for monitoring said traffic on said base station; and determination logic for determining said determined alarm threshold time based upon at least one of the time of the day and the day of the week when said timer is set.

7. The telecommunications system of claim 1, wherein said mobile switching center further comprises:

comparison logic for comparing the value of said timer with said determined alarm threshold time.

8. The telecommunications system of claim 1, wherein said mobile switching center further comprises:

deactivation logic for deactivating said alarm when said traffic on said base station resumes.

9. A method for providing a cell traffic supervision alarm, comprising the steps of:

calculating, by a communication node, at least one alarm threshold time for a base station connected to said communication node;

monitoring, by said communication node, traffic on said base station;

setting a timer when said traffic on said base station ceases; and activating said cell traffic supervision alarm when said timer reaches a determined one of said at least one alarm threshold time for said base station.

10. The method of claim 9, wherein said step of calculating further comprises the steps of:

determining a usage statistic type for said base station;

compiling usage statistics of said usage statistic type based upon at least one of the time of the day and the day of the week;

converting said usage statistics into said at least one alarm threshold time as a function of at least one of the time of the day and the day of the week; and storing said at least one alarm threshold time in a database within said communication node.

11. The method of claim 10, further comprises the step of:

determining said determined alarm threshold time based upon at least one of the time of the day and the day of the week when said timer is set.

12. The method of claim 10, wherein said step of calculating further comprises the step of:

setting a false alarm probability parameter, said usage statistics being converted based upon said false alarm probability parameter.

13. The method of claim 9, further comprising the step of:

deactivating said cell supervision alarm when said traffic on said base station resumes.

14. The method of claim 9, further comprising the step of:

disabling said timer when said traffic on said base station resumes, said step of activating not being performed when said timer is disabled.

15. A mobile switching center for providing a cell traffic supervision alarm, comprising:

monitoring logic for monitoring traffic on a base station connected to said mobile switching center;

means for setting a timer when said traffic on said base station ceases; and means for activating said cell traffic supervision alarm when said timer reaches a determined alarm threshold time calculated by said mobile switching center for said base station.

16. The mobile switching center of claim 15, further comprising:

compilation logic for compiling usage statistics based upon at least one of the time of the day and the day of the week for said base station.

17. The mobile switching center of claim 16, further comprising:

conversion logic for converting said usage statistics into at least one alarm threshold time as a function of at least one of the time of the day and the day of the week.

18. The mobile switching center of claim 17, further comprising:

a false alarm probability parameter, said conversion logic using said false alarm probability parameter to convert said usage statistics into said at least one alarm threshold time.

19. The mobile switching center of claim 17, further comprising:

a database for storing said at least one alarm threshold time.

20. The mobile switching center of claim 17, further comprising:

determination logic for determining said determined alarm threshold time based upon at least one of the time of the day and the day of the week when said timer is set.

21. The mobile switching center of claim 15, further comprising:

comparison logic for comparing the value of said timer with said determined alarm threshold time.

22. The mobile switching center of claim 15, further comprising:

deactivation logic for deactivating said alarm when said traffic on said base station resumes.

* * * * *